Nov. 4, 1958 W. S. BRUMMETT 2,859,102
GAS MIXER
Filed April 20, 1956
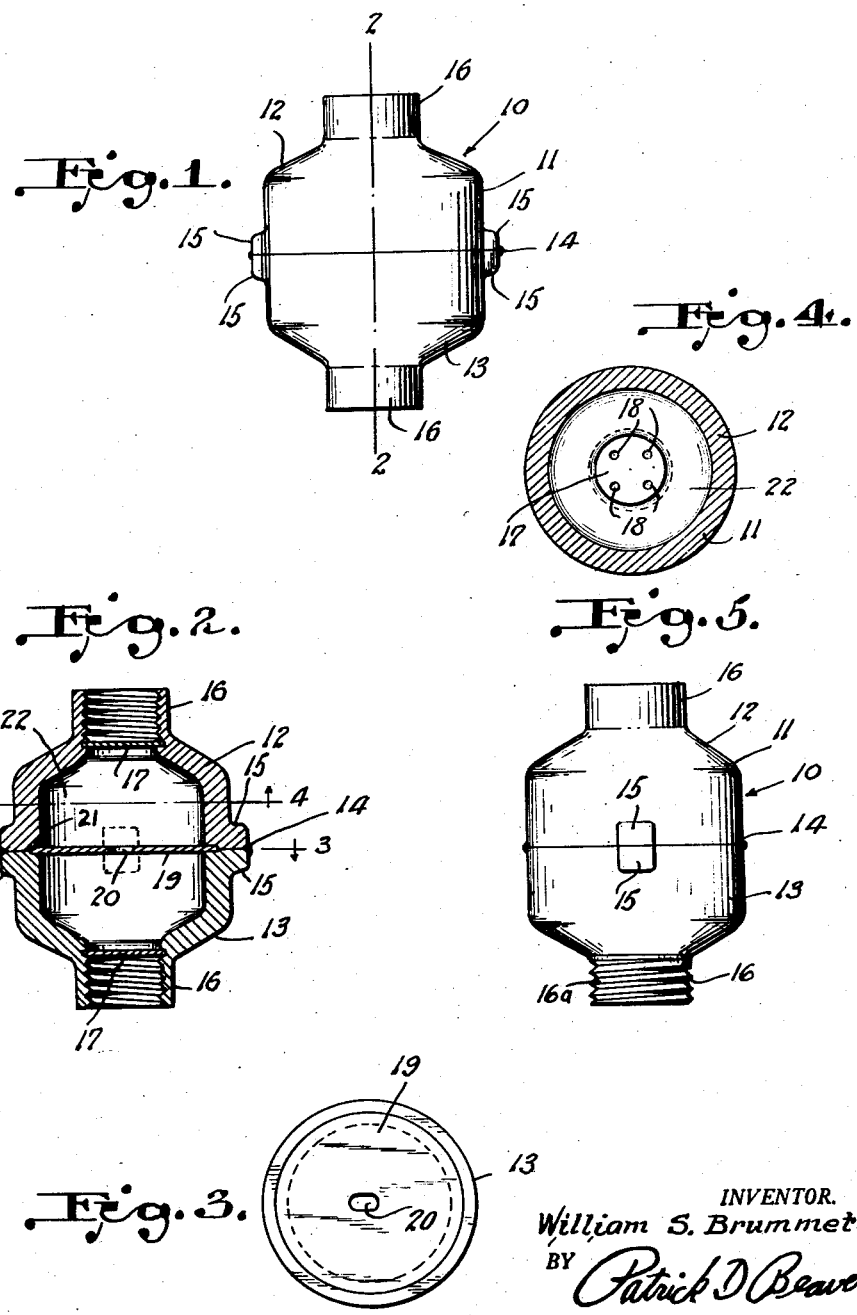
INVENTOR.
William S. Brummett
BY Patrick D Beavers
ATTORNEY.

United States Patent Office 2,859,102
Patented Nov. 4, 1958

2,859,102

GAS MIXER

William S. Brummett, Tulsa, Okla.

Application April 20, 1956, Serial No. 579,653

1 Claim. (Cl. 48—180)

This invention relates to devices for mixing gas so that a substantial saving in gas is achieved with a hotter and better fire or flame.

An object of the invention is to provide a device of this character that, interpolated in a pipe line leading from the meter to the burner, will stop fluctuation in the flow of gas.

Another object of the invention is to provide a device of the character that will diversify the various components of the gas to thoroughly mix the heavy and light carbon components with the air.

A further object of the invention is to provide a device of the character that will eliminate monoxide gases and thus create a greater intensity of heat in the burner.

With the above and other objects and advantages in view, the invention consists of the novel details of construction, arrangement and combination of parts more fully hereinafter described, claimed and illustrated in the accompanying drawing in which:

Fig. 1 is an elevational view of a gas saver and mixer embodying the invention;

Fig. 2 is a vertical sectional view on the line 2—2 of Fig. 1;

Fig. 3 is a transverse sectional view on the line 3—3 of Fig. 2;

Fig. 4 is a transverse sectional view on the line 4—4 of Fig. 2; and

Fig. 5 is a modified form of the invention shown in Fig. 1.

Referring more in detail to the drawing, wherein like parts are designated by like reference numerals, the reference numeral 10 is used to generally designate a gas saver and mixer embodying the invention.

The gas saver and mixer 10 comprises a body or housing 11 that is equally divided into two bowl-like sections 12 and 13 and which provides therein a chamber 22.

The housing is reversible using either section as an inlet or outlet section and the sections are welded in fixed relation to each other along the central demarkation line 14.

Oppositely disposed nibs 15 on each of the sections further strengthen the weld at the line 14.

Each section has a centrally located internally threaded coupling 16 for connecting the housing 11 within a pipe line. The coupling and bowl shaped section are integral and each section is a duplicate of the other.

A small disk 17, having a plurality of radially disposed apertures 18 therein, Fig. 4, is placed in each of the couplings 16 at the innermost thread thereof. A large disk 19, having a central aperture 20 therein, is placed in a groove 21 formed in the walls of the sections 12 and 13 at the demarkation line 14.

In Fig. 5 the only difference that exists between this form of the invention and the forms previously described is that one of the couplings 16 is exteriorly threaded, as indicated at 16a. Otherwise, this form of the invention is as previously described.

Gas entering either of the sections 12 or 13 will, by reason of the apertures 18, be subjected to a turbulent action.

The turbulent action created in the mixing chamber 22 will thoroughly mix all of the components of the gas, thus carrying out the object of the invention.

To install the gas saver and mixer 10, the pipe line between the meter and burner is severed and the gas saver and mixer 10 is connected to the severed ends of the pipe line. Either form of the invention being used as the connection made in the pipe line warrant such selection.

It is believed that from the foregoing description the operation and construction of the invention will be apparent to those skilled in the art, and it is to be understood that changes in the minor details of construction, arrangement and combination of parts may be resorted to provided they fall within the spirit of the invention and the scope of the appended claim.

I claim:

A gas saver and mixer comprising a housing, divided into a pair of sections, each provided with an internally threaded neck for receiving the threaded ends of conduits, a disk having a central aperture, interposed between the sections, said sections being secured together to hold said disks in fixed position, a disk in each of the internally threaded neck portions, the latter two disks being apertured and substantially spaced from the first mentioned disk to provide substantially large mixing chambers.

References Cited in the file of this patent

UNITED STATES PATENTS

| | | |
|---|---|---|
| 58,055 | Boynton | Sept. 18, 1866 |
| 974,551 | Carpenter | Nov. 1, 1910 |
| 1,138,628 | Cook | May 11, 1915 |
| 1,178,473 | Sunderman | Aug. 4, 1916 |
| 1,542,933 | Gepfert | June 23, 1925 |
| 1,927,947 | Newell | Sept. 26, 1933 |